United States Patent
Grgich et al.

(10) Patent No.: US 11,016,199 B1
(45) Date of Patent: May 25, 2021

(54) SYSTEM AND METHOD FOR VALIDATING GNSS AMBIGUITIES

(71) Applicant: Swift Navigation, Inc., San Francisco, CA (US)

(72) Inventors: Paul Grgich, San Francisco, CA (US); Anthony Mark Cole, San Francisco, CA (US); Sébastien Carcanague, San Francisco, CA (US)

(73) Assignee: Swift Navigation, Inc., San Francisco, CA (US)

(\*) Notice: Subject to any disclaimer, the term of this patent is extended or adjusted under 35 U.S.C. 154(b) by 0 days.

(21) Appl. No.: 17/119,823

(22) Filed: Dec. 11, 2020

Related U.S. Application Data

(60) Provisional application No. 62/946,576, filed on Dec. 11, 2019.

(51) Int. Cl.
    *G01S 19/23* (2010.01)

(52) U.S. Cl.
    CPC .................. *G01S 19/23* (2013.01)

(58) Field of Classification Search
    CPC ...... G01S 19/23; G01S 19/235; G01S 19/258; G01S 19/29; G01S 19/256
    USPC ...................................... 342/357.62
    See application file for complete search history.

(56) References Cited

U.S. PATENT DOCUMENTS

| | | | |
|---|---|---|---|
| 7,692,578 B2 | 4/2010 | Vollath et al. | |
| 8,542,146 B2 | 9/2013 | Vollath | |
| 2007/0120733 A1* | 5/2007 | Vollath | G01S 19/44 342/357.27 |
| 2011/0140959 A1* | 6/2011 | Vollath | G01S 19/44 342/357.27 |
| 2016/0077214 A1 | 3/2016 | Xianglin | |
| 2017/0322313 A1 | 11/2017 | Revol et al. | |
| 2018/0246221 A1 | 8/2018 | Horn et al. | |
| 2019/0204450 A1 | 7/2019 | Revol | |
| 2019/0377095 A1 | 12/2019 | Brenner | |
| 2020/0041658 A1* | 2/2020 | Laurichesse | G01S 19/32 |
| 2020/0257002 A1* | 8/2020 | Henkel | G01S 19/04 |

OTHER PUBLICATIONS

Brack, A. "Optimal Estimation of a Subset of Integers With Application to GNSS" Technische University at Munchen (TUM), Munich, Germany Institute for Communications and Navigation, Artificial Satellites, vol. 51, No. 4-2016 DOI: 10.1515/arsa-2016-0011.

Henkel, Patrick et al. "Joint L-/C-Band Code and Carrier Phase Linear Combinations for Galileo" International Journal of Navigation and Observation.

Urquhart, Landon "An Analysis of Multi-Frequency Carrier Phase Linear Combinations for GNSS" Department of Geodesy and Geomatics Engineering, University of New Brunswick, Feb. 2009.

(Continued)

*Primary Examiner* — Harry K Liu
(74) *Attorney, Agent, or Firm* — Jeffrey Schox; Diana Lin

(57) ABSTRACT

A system and method for determining a mobile receiver position includes receiving a first and a second set of satellite observations; determining a first and second fixed ambiguity set associated with a first and second transformation respectively; determining cross-validated ambiguities between the first and second fixed ambiguity sets; and determining the mobile receiver position based on at least one of the first or second fixed ambiguity sets.

20 Claims, 4 Drawing Sheets

(56) References Cited

OTHER PUBLICATIONS

Verhagen, S. The GNSS integer ambiguities: Estimation and validation Aerospace Engineering, Jan. 31, 2005.
Teunissen, P. J. G. "On the GPS widelane and its decorrelating property" Delft Geodetic Computing Centre, Journal of Geodesy (1997) 71: 577-587.
Verhangen, S. "The GNSS integer ambiguities: Estimation and validation":: https://repository.tudelft.ml/islandora/object/uuid, Aerospace Engineering Jan. 31, 2005.

* cited by examiner

SYSTEM AND METHOD FOR VALIDATING GNSS AMBIGUITIES

CROSS-REFERENCE TO RELATED APPLICATIONS

This application claims the benefit of U.S. Provisional Application No. 62/946,576, filed 11 Dec. 2019, which is incorporated in its entirety by this reference.

TECHNICAL FIELD

This invention relates generally to the satellite positioning field, and more specifically to a new and useful system and method in the satellite positioning field.

BACKGROUND

Traditionally, a receiver position is determined based on a set of satellite observations within a given time frame. These satellite observations are used to calculate the receiver position. However, satellite observations can, for example, include outliers and noisy data that can decrease the positioning accuracy. To achieve high levels of precision in the position, it can be desirable to validate the result. Thus, there is a need in the satellite positioning field to create a new and useful system and method. This invention provides such new and useful system and method for validating GNSS ambiguities.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2:
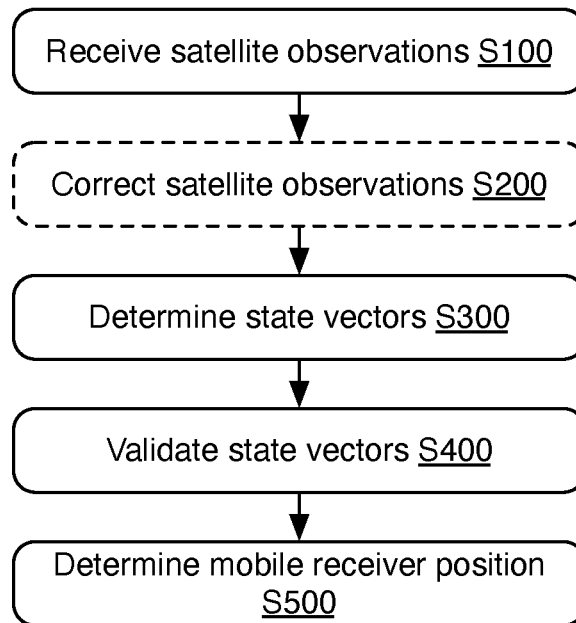
FIG. 2 is a schematic representation of the method.

As shown in FIG. 2, a method includes receiving satellite observations, determining state vectors, validating the state vectors, and determining the receiver position. The method can optionally include correcting the satellite observations. Validating the state vectors can include determining one or more transformations, transforming the ambiguities, and comparing the ambiguities.

Figure 1:
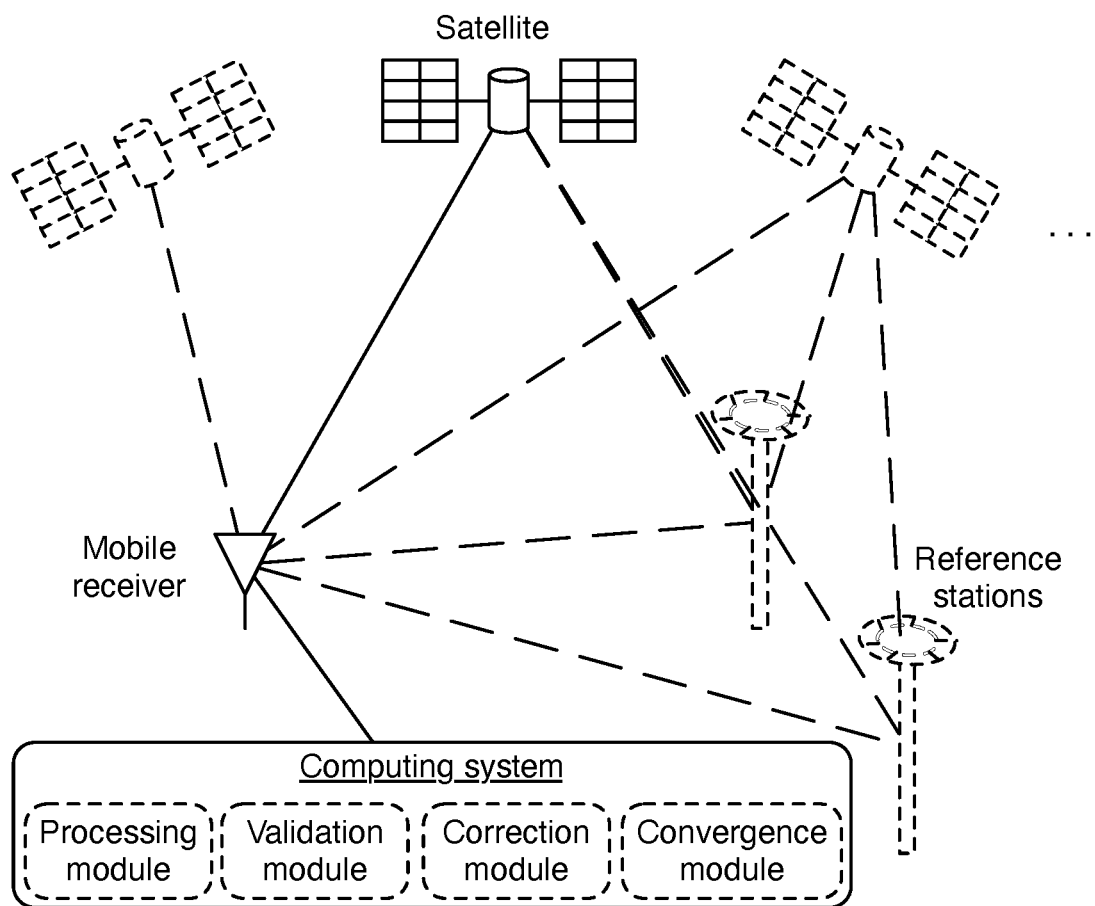
FIG. 1 is a schematic representation of the system.

As shown in FIG. 1, the system includes one or more receivers and a computing system. The system can optionally include one or more sensors, and/or any suitable components. The system is preferably communicably connected to one or more data sources (e.g., reference stations, satellites, satellite constellations, etc.).

The system and method preferably function to estimate a position of a GNSS receiver and/or an external system. Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (TOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system.

2. Benefits.

Variations of the technology can confer several benefits and/or advantages.

First, the inventors have discovered that in some applications, to achieve high accuracy and/or high integrity positioning solutions based on GNSS techniques, in addition to validation steps performed when fixing the integer ambiguities, validation steps between integer ambiguity sets (e.g., fixed integer ambiguities) can be beneficial. The inter-ambiguity set validation can increase a confidence in the resulting ambiguities and can lead to more accurate and/or higher integrity positioning solutions.

Second, variants of the technology can be used independent of the data sources (e.g., satellites, satellite constellations, satellite frequencies, sensors, reference stations, etc.) and/or relationships between or within data collected from data sources. In specific examples, the technology can validate the state vectors (e.g., state vectors that are determined for different data sets and/or by different filters), regardless of what transformation(s) are applied to each state vector.

Third, variants of the technology can determine an optimal or near-optimal number of states that can be compared between state vectors, which can improve the probability of successful validation between the state vectors, can provide an optimal or near-optimal set of validated states, and/or otherwise improve the state vector determination.

However, variants of the technology can confer any other suitable benefits and/or advantages.

3. System.

The system preferably functions to determine the position of a receiver and/or external system, determine a plurality of state vectors, and validate the state vectors.

The system preferably uses a set of data collected by one or more data sources. Data sources can include: receivers, sensors (e.g., located onboard the receiver, the external system, a reference stations, etc.), databases, reference stations, satellites, and/or any other suitable data source. Examples of data that can be used include: satellite observations, sensor observations, and/or any other suitable data.

The receiver (e.g., mobile receiver) preferably functions to receive a set of satellite observations (e.g., satellite signals) from one or more satellites. In variants, the receiver can determine the location (e.g., pseudorange) of the receiver (and/or external system) based on the satellite observations. The receiver is preferably in communication with the computing system. However, the receiver can be integrated with the computing system, and/or the receiver and computing system can be arranged in any suitable manner. The receiver is preferably a stand-alone device (e.g., a GNSS receiver, antenna). However, the receiver can be integrated into the external system (e.g., be a component of an automobile, aero vehicle, nautical vehicle, etc.), can be a user device (e.g., smart phone, laptop, cell phone, smart watch, etc.), and/or can be configured in any suitable manner.

The set of satellite observations can include orbital data (e.g., ephemeris), timestamp, code data, carrier phase data, pseudocode data, and/or any suitable data. The set of satellite observations preferably includes satellite observations corresponding to satellites from more than one satellite constellation (e.g., Global Positioning System (GPS), GLObal Navigation Satellite System (GLONASS), BeiDou positioning System (BDS), Galileo, etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data. Each satellite observation from the set of satellite observations preferably corresponds to a common time window (e.g., epoch). However, each satellite observation can be associated with a time stamp (e.g., time of transmission, time of receipt, time of processing, etc.), and/or the satellite observations can have any suitable timing.

In variants of the system including more than one receiver, each receiver can be configured to receive satellite observations associated a satellite constellation, a carrier frequency (e.g., the L1, L2, L5, E1, E5a, E5b, Eab, E6, G1, G3, B1, B2, B3, LEX, etc. frequencies), and/or corresponding to any suitable data. In an illustrative example, a receiver can include a first antennae configured to receive satellite signals from GPS satellites and a second antennae configured to receive satellite signals from Galileo satellites.

The computing system preferably functions to process the data (e.g., satellite observations, reference station observations, sensor data, etc.) received by the receiver. The computing system can: aggregate the data (e.g., combine the receiver satellite observations, reference station satellite observations, satellite corrections, and/or sensor data; reorganize the receiver satellite observations, reference station satellite observations, and/or sensor data such as based on the time stamp, time of transmission, time of receipt, etc.; etc.), filter the data (e.g., to calculate state vectors, ambiguities such as phase ambiguities, etc. associated with the data), calculate the receiver position (e.g., based on the ambiguities), calculate the external system location, correct the data (e.g., correct the satellite observations for clock errors, hardware bias, atmospheric effects, etc.), and/or can process the data in any suitable manner. The computing system can be local (e.g., to the external system, to the receiver, to the sensor, etc.), remote (e.g., cloud computing, server, networked, etc.), and/or otherwise distributed.

The computing system is preferably communicably coupled to the receiver and/or the sensors, but can be communicably coupled to any suitable data sources. The computing system is preferably colocalized with (e.g., integrated into) the receiver (and/or external system), but the computing system can be remote from the receiver (and/or external system), and/or configured in any suitable manner.

In specific variants of the system including one or more sensors, the sensors preferably function to measure sensor data (e.g., auxiliary data) associated with the external system (and/or the receiver). The sensor data can be used to assist (e.g., speed-up, correct, refine, etc.) the calculation (e.g., calculating the state vector, estimating the phase ambiguity). In a specific example, the sensor data can be used to estimate the receiver position at times when satellite observations are not received (e.g., in an urban canyon; due to an obstruction such as a billboard, weather, etc.; etc.). However, the sensor data can be used at any suitable time and in any suitable manner. The sensors are preferably in communication with the computing system. The sensors can be: on-board the external system, on-board a separate external system, integrated into the receiver, separate from the receiver, and/or otherwise associated with the receiver. The sensor data can include: inertial data (e.g., velocity, acceleration), odometry, pose (e.g., position, orientation), mapping data (e.g., images, point clouds), temperature, pressure, ambient light, and/or any other suitable data. The sensors can include one or more of: inertial moment unit (IMU), accelerometer, gyroscope, magnetometer, odometer (e.g., visual odometry, wheel odometry, etc.), and/or any suitable sensor.

4. Method.

The method functions to determine the position of a receiver (e.g., an external system coupled to the receiver) based on one or more sets of satellite observations. The method preferably validates the position of the receiver and/or one or more intermediate (e.g., state vector) used to determine the position of the receiver. One or more instance of the method and/or steps of the method can be performed in series and/or in parallel (e.g., concurrently).

Receiving one or more satellite observations S100 preferably functions to measure (e.g., at the receiver, at reference stations, etc.) and/or access one or more set of satellite observations (e.g., carrier phase measurements. pseudorange measurements, etc.) from one or more observed satellites. The satellite observations can be measured and/or received by a receiver, retrieved from a database (e.g., retrieve stored satellite observations; retrieve stored corrections; retrieve an almanac such as of weather conditions, tides, etc.; etc.), and/or be otherwise received. S100 can include receiving Doppler measurement data, sensor data, and/or any suitable data. The satellite observations can include signals from one or more satellite constellations. Each set of satellite observations preferably corresponds to a plurality of satellite constellations. However, one or more set of satellite observations can correspond to a single satellite constellation.

S100 is preferably performed before correcting the satellite observations S200; however, S100 can be performed at the same time as S200. S100 is preferably performed before determining the state vectors S300; however, S100 and S300 can be performed at the same time and/or S300 can be performed before S100 (e.g., during different time windows). S100 is preferably performed by a receiver. However, S100 can additionally or alternatively be performed by one or more reference stations, by one or more sensors, and/or by any suitable component.

The data (e.g., satellite observations, sensor data, etc.) received in S100 is preferably measured during a time window (e.g., time period, epoch). Each of the sets of satellite observations can correspond to the same and/or to a different time window. In variants, after the time window has expired, the method can include repeating S100 during a second time window. The second time window can be the same duration as the time window and/or a different duration. The second time window preferably immediately follows the time window; however, the second time window can be delayed relative to the time window by any amount. The (first and second) time windows are preferably separate and distinct (e.g., consecutive, nonconsecutive, etc.), but can alternatively overlap. The second time window can additionally or alternatively be started in response to a trigger event (e.g., convergence of one or more calculation; collective convergence of the calculations; receiver position; loss of satellite observations such as for a specific satellite, for an amount of time, etc.; etc.), at a predetermined time, and/or at any suitable time. However, the time window can be extended and/or any suitable action can occur in response to the trigger event.

Correcting the satellite observations S200 preferably functions to correct the satellite observations for local and/or global errors. S200 is preferably performed by a computing system (e.g., a correction module of a computing system), but can be performed by any system or component. The corrections are preferably received from a computing system (e.g., a remote computing system, a cloud computing system, corrections service, etc.), but can additionally or alternatively be generated by the computing system (e.g., based on reference station data, based on almanac data, based on a model, etc.), received from a reference station, and/or be otherwise accessed. S200 is preferably performed before determining the state vector S300. However, S200 can be performed at the same time as and/or after S300. S200 preferably corrects all of the satellite observations within each set of satellite observations. However, any suitable subset of satellite observations can be corrected. Corrections can be applied in response to (e.g., to correct): hardware bias, timing errors (e.g., satellite clock, receiver clock, reference station clock, etc.), atmospheric effects (e.g., ionosphere effects, tropospheric effects), relativistic effects, local effects (e.g., multipath errors), global effects, noise (e.g., outliers), and/or any suitable effects. In a specific example, reference station satellite observations can be used to correct the receiver satellite observations such as by calculating double differenced satellite observations. In a second example, effects (e.g., atmospheric effects) on satellite observations can be modelled. Based on the model, the satellite observations can be corrected. However, correcting the satellite observations can be performed in any suitable manner. In an illustrative example, the corrections can be generated as disclosed in and/or received from a corrections service as disclosed in U.S. patent application Ser. No. 16/589,932 filed 1 Oct. 2019 entitled "SYSTEMS AND METHODS FOR DISTRIBUTED DENSE NETWORK PROCESSING OF SATELLITE POSITIONING DATA," which is incorporated in its entirety by this reference. However, the corrections can be otherwise generated.

Determining the state vector S300 preferably functions to process the data (e.g., satellite observations, corrected satellite observations, sensor data) to determine phase ambiguities (e.g., fixed integer phase ambiguities) associated with each set of satellite observations. States of the state vector preferably include a carrier phase ambiguity (e.g., calculated as float ambiguities, calculated as an integer ambiguity, etc.) associated with one or more satellites (e.g., each satellite that provided one or more observation in the set of satellite observations) and phase ambiguity covariances (and/or correlations) associated with each one or more pairs of satellites (e.g., pairs of satellites that provided observations in the set of satellite observations). However, the state vector can additionally or alternatively include residuals (e.g., for the phase ambiguities, for the covariances), a validity of one or more states, a receiver position, an external system location, pseudorange, atmospheric error or effect, estimated error (e.g., estimated error in one or more states in the state vector), derivatives of one or more states (e.g., first, second, etc. derivative such as with respect to time, with respect to position, etc.), and/or any suitable state. S300 is preferably performed by a computing system (e.g., a processing module of a computing system), but can be performed by any component. S300 is preferably performed before validating the state vectors S400. However, S300 can be performed at the same time as and/or after S400 (e.g., when a subset of the state vector is validated and said subset is used to determine the remainder of the state vector). S300 is preferably performed twice for each instance of the method (e.g., to generate a first state vector and a second vector associated with a first and second set of satellite observations, respectively). However, S300 can be performed once for each instance of the method (e.g., wherein one instance of the method is compared or validated relative to another instance of the method), and/or can be performed any number of times.

S300 can include: determining a set of floating phase ambiguity hypotheses, determining a set of integer phase ambiguity hypotheses from the set of floating phase ambiguity hypotheses, performing hypothesis testing to validate the set of integer phase ambiguities hypotheses, and/or any suitable steps. In an illustrative example, S300 can include steps and/or be performed as disclosed in U.S. patent application Ser. No. 16/685,927 filed 15 Nov. 2019 entitled "SYSTEM AND METHOD FOR SATELLITE POSITIONING" and/or U.S. patent application Ser. No. 16/817,196 filed 12 Mar. 2020 entitled "SYSTEMS AND METHODS FOR REAL TIME KINEMATIC SATELLITE POSITIONING," each of which is incorporated in its entirety by this reference.

Determining a set of floating phase ambiguity hypotheses preferably functions to determine a phase ambiguity (typically in a floating point representation, but other representations can be used) associated with each satellite represented in the set of satellite observations. The set of floating phase ambiguity hypotheses are preferably determined using a filter. The filter is preferably a Kalman filter. However, the filter can be an extended Kalman filter, an unscented Kalman filter, a Bierman-Thornton filter, a particle filter, Monte Carlo simulation, and/or any suitable mean-square error filter and/or sensor fusion algorithm. The inputs to the filter can include: satellite observations (e.g., receiver satellite observations, corrected satellite observations, reference station satellite observations, etc.), sensor data, and/or any suitable data. The output of the filter is preferably a state vector and/or one or more states of a state vector, but can include any suitable information.

Determining a set of integer phase ambiguity hypotheses preferably functions to constrain (and/or otherwise determine from) the set of floating phase ambiguity hypotheses to a set of integer phase ambiguity hypotheses. Integer phase ambiguities can be beneficial for improving an accuracy of the determined receiver position as compared to the receiver position determined using floating ambiguities. Determining the set of integer phase ambiguity hypotheses can include reducing a correlation between ambiguities of the set of phase ambiguities (e.g., floating phase ambiguity hypotheses) and performing a search (e.g., a least squares search, an absolute value search, etc.) to identify possible integer phase ambiguities to include in the set of integer phase ambiguity hypotheses. For example, Least-Squares Ambiguity Decorrelation Adjustment (LAMBDA) algorithm, modified-LAMBDA (MLAMBDA) algorithm, LLL reduction algorithm, a whitening transformation, a coloring transformation, a decorrelation transformation, rounding, the Ambiguity Function Method (AFM), Fast Ambiguity Resolution Approach (FARA), Least-Squares Ambiguity Search Techniques (LSAST), integer bootstrapping, and/or any suitable decorrelation or reduction algorithm can be used to fix and/or identify integer phase ambiguities. The set of integer phase ambiguity hypotheses preferably includes integer phase ambiguities that satisfy a hypothesis criterion, but can include any suitable integer phase ambiguities. Example of hypotheses criterion include a threshold sum of least squares, a threshold sum of absolute differences, a threshold likelihood of the correct solution, and/or any suitable criterion. However, the set of integer phase ambiguity hypotheses can be generated in any manner.

Performing hypothesis testing preferably functions to determining the integer phase ambiguities from the set of integer phase ambiguity hypotheses that are most likely to be correct. The hypothesis test is preferably a Bayesian inference, but can additionally or alternatively be based on a statistical confidence, significance testing, and/or any suitable hypothesis testing. Examples of hypothesis tests can include difference test, ratio test, projector test, f-test GIA test, and/or any suitable hypothesis test. In an illustrative example, performing hypothesis testing can include determining a probability (e.g., a likelihood, a log likelihood, etc.) associated with subsets of integer phase ambiguities of the integer phase ambiguity hypotheses; computing a ratio of the probability between two subsets of integer phase ambiguities (e.g., within the same ambiguity set, across different ambiguity sets); when the ratio between a most-likely and a next most likely subset of integer phase ambiguities exceeds a threshold, storing the most-likely subset of integer phase ambiguities as the integer phase ambiguities and ceasing hypothesis testing. However, any hypothesis testing can be performed.

In variants, the most-likely subset of integer phase ambiguities can be referred to as internally-validated integer phase ambiguities (e.g., integer phase ambiguities that are validated against the remaining integer phase ambiguities from the same set of integer phase ambiguity hypotheses). The internally-validated integer phase ambiguities can be contrasted with cross-validated integer phase ambiguities (e.g., integer phase ambiguities as validated in step S400).

In embodiments of S300, S300 can be performed more than once to generate at least two state vectors. Each state vector can be determined consecutively, iteratively, sequentially, delayed, and/or with any suitable timing relative to the other state vectors. The plurality of state vectors is preferably independent of one another, but can be correlated, dependent on each other, and/or otherwise be related. Each state vector can include a subset of common states (e.g., common integer phase ambiguities such as those associated with the same data source), a subset of distinct states (e.g., integer phase ambiguities associated with different data sources, uncommon states, etc.), and/or the states in the first and second state vectors can be otherwise related. Different state vectors can differ in: satellite composition, frequency, sampling epoch, otherwise differ, or not differ (e.g., share all or a portion of satellite observations). The states within each state vector can share: satellites, frequencies, sampling epochs, other parameters, or no parameters.

In a first variant, two (or more) state vectors can be associated with (e.g., generated from) a two (or more) distinct sets of satellite observations (e.g., a first and a second set of satellite observations). The distinct sets of satellite observations preferably include observations from at least three common satellites, but can include observations from any number of common satellites. In an illustrative example, the first and second set of satellite observations can correspond to sets of satellite observations that are sent to distinct Kalman filters as disclosed in U.S. patent application Ser. No. 16/685,927 filed 15 Nov. 2019 entitled "SYSTEM AND METHOD FOR SATELLITE POSITIONING" and incorporated in its entirety by this reference. In a second variant, two (or more) state vectors can be generated using two (or more) different filters (and/or methods). For example, a first state vector can be generated using phase hypotheses generated using a Kalman filter and a second state vector can be generated using phase hypotheses generated using a Bierman-Thornton filter. In a second example of the second variant, a first and second state vector can each be generated with different initial state guesses. However, the state vectors can be generated using any suitable data and/or any suitable method.

In embodiments of S300, the state vector(s) can be associated with one or more transformations. The transformation can improve the phase ambiguity determination (e.g., enable the phase ambiguity to be determined quickly, enable the phase ambiguity to be determined with greater accuracy, etc.), improve the receiver position estimate (e.g., improve the accuracy or integrity of the determined receiver position), and/or otherwise be used. The output of the filter (e.g., the state vector) can include the transformed phase ambiguity, the transformed phase ambiguity can be determined from the state vector (e.g., by transforming the phase ambiguities of the state vector), and/or the transformed phase ambiguity can be otherwise related to the state vector. Examples of transformations include: single differenced combinations, double differenced combinations, triple differenced combinations, wide lane combinations, middle lane combinations, narrow lane combinations, extra-wide lane combinations, ionosphere free combinations, geometry free combinations, noise reduced combinations, ionospheric delay reduced combinations, noise reducing combinations, linear combinations (e.g., between two or more carrier frequencies of satellite observations, between two or more data sources such as satellite observations and reference station observations, etc.), and/or any suitable combination of data source observations.

Each transformation is preferably an n×m matrix where n is less than or equal to m, where m corresponds to the number of ambiguities in the respective ambiguity set (e.g., ambiguity vector, state vector, etc.), and where n corresponds to the number of ambiguities in the transformed space. However, n can be greater than m. The elements of the transformation matrices are preferably integers, but can be rational, real, complex, and/or have any values. In a set of specific examples, the transformations can include: transforming to wide-lane ambiguities, transforming to decrease the correlation between the ambiguities, transforming to a rotated state space, transforming to a scaled state space, transforming to a truncated state space, and/or transforming in any suitable manner.

In an illustrative example, the transformed phase ambiguity (e.g., transformed integer phase ambiguity) can be determined according to: $\hat{z}_i = \hat{T}_i \hat{a}_i$ where $z_i$ is the transformed phase ambiguity, $T_i$ is the transformation relating the underlying phase ambiguity $a_i$ to the transformed phase ambiguity. The transformed phase ambiguity and the underlying phase ambiguity are preferably both integers, but either can be rational numbers, floating values, real valued, and/or otherwise by related. However, the transformed phase ambiguity can be otherwise determined. When more than one state vector is determined, each state vector can be associated with the same or a distinct transformation.

Validating the state vectors S400 preferably functions to cross validate one or more states from two or more state vectors (e.g., determine what states of two or more state vectors match). S400 preferably functions to cross-validate a subset of integer phase ambiguities (e.g., internally-validated integer phase ambiguities) from the first state vector with a subset of integer phase ambiguities from the second state vector. However, any suitable state(s) can be cross-validated between the first and second state vector. S400 is preferably performed by a computing system (e.g., a validation module of a computing system). However, S400 can be performed by any suitable component. S400 is preferably performed before determining the receiver position S500. However, S400 can be performed at the same time as and/or after (e.g., in examples where the receiver position is used to validate the state vectors) S500. S400 is preferably performed after S300, such that the states (e.g., the phase ambiguities) that S400 is analyzing are fixed; however, S400 can optionally analyze unfixed states (e.g., unfixed ambiguities). The state vectors are preferably validated based on a collective convergence criterion (e.g., a validation metric, validation score). The collective convergence criterion can include: one or more subsets of transformations associated with the state vectors matching, subsets of ambiguities matching across the state vectors, a residual threshold, one or more states (e.g., from each of the calculations) matching, a timeout, a covariance threshold, a receiver position threshold, and/or any suitable criterion.

S400 can include: combining the first and second state vectors 420, determining an intersection transformation S450, comparing the state vectors in the intersection space S480, and/or any suitable steps.

The first and second state vectors preferably at least partially share states from satellite observations from common: satellites, frequencies, and/or epochs, but can alternatively include entirely unrelated satellite observations. In a first example, the first and second state vectors share states from observations from common satellites, frequencies, and epochs. In a second example, the first and second state vectors share states from observations from common satellites and frequencies, but different epochs.

S420 preferably functions to combine the first and second state vector to generate a combined state vector. The combined state vector preferably includes the non-transformed integer phase ambiguities (e.g., internally-validated integer phase ambiguity, fixed integer phase ambiguities, etc.) from the first and second state vector, but can additionally or alternatively include the transformed integer phase ambiguities, a subset of integer phase ambiguities, and/or any suitable states from the first and/or second state vectors. The combined state vector can be an augmented state vector (e.g., including all or a majority of integer phase ambiguities associated with the first and the second state vector), a common state vector (e.g., including the common integer phase ambiguities from the first and second state vector), an uncommon state vector (e.g., including uncommon ambiguities or unshared ambiguities), and/or any suitable state(s) can be included in the combined state vector.

Figure 3:
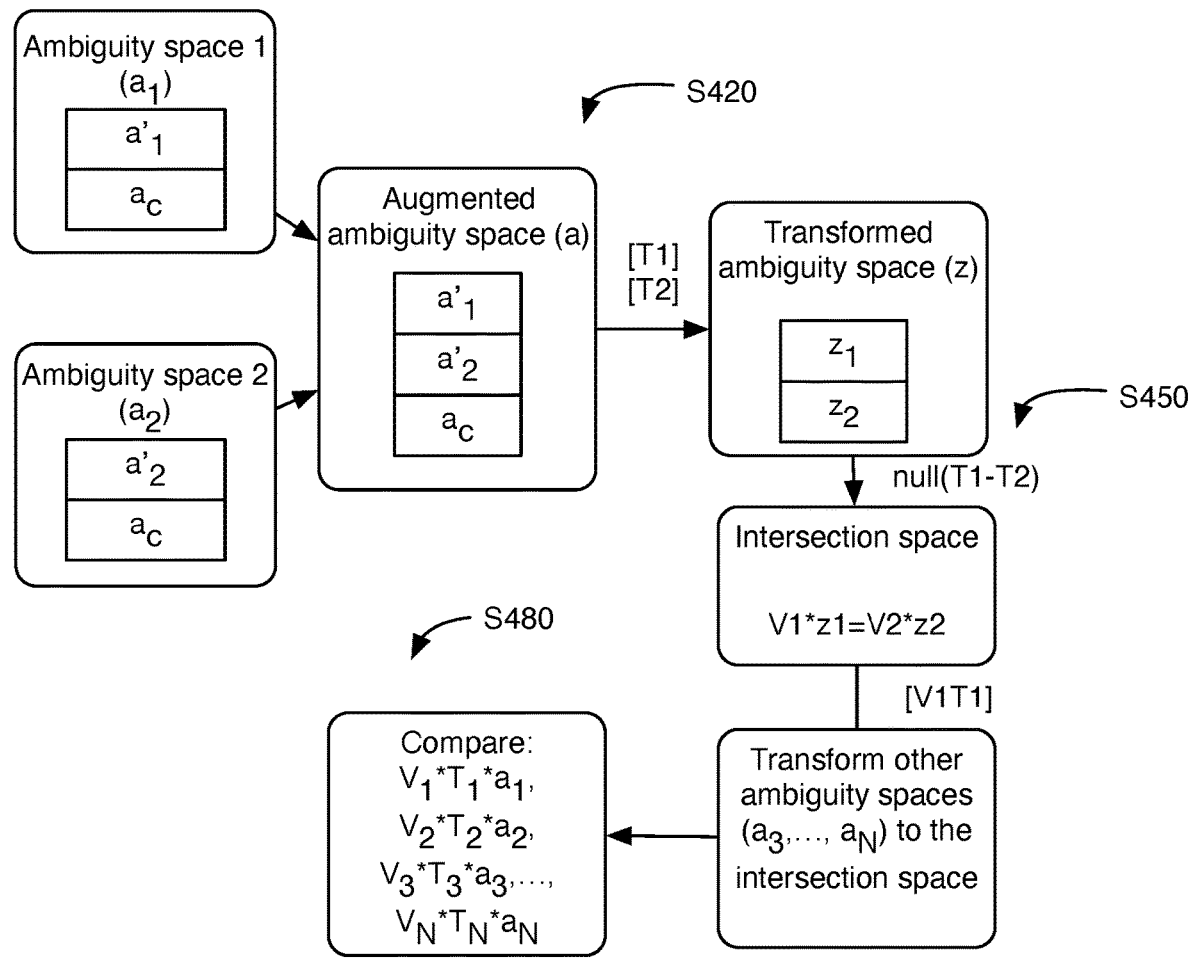
FIG. 3 is a schematic representation of an example of transforming the state vectors.

In a specific example, as shown in FIG. 3, S420 can be performed using two fixed integer phase ambiguity sets. The fixed integer phase ambiguity sets are preferably not linearly independent (e.g., include one or more common fixed integer phase ambiguity, two fixed integer phase ambiguity sets, $a_1$ and $a_2$ can be expressed as $$a_1 = \begin{bmatrix} a'_1 \\ a_c \end{bmatrix}$$

and $$a_2 = \begin{bmatrix} a'_2 \\ a_c \end{bmatrix},$$

where $a_c$ are common ambiguities and $a'_1$ and $a'_2$ are unique ambiguities associated with $a_1$ and $a_2$ respectively, etc.). However, the fixed integer phase ambiguity sets can be linearly independent. The common ambiguities (e.g., shared ambiguities) preferably correspond to ambiguities associated with a common data source (e.g., satellite, reference station, satellite constellation, satellite frequency, sensor, etc.). The unique ambiguities (e.g., in the set of unique ambiguities associated with $a_1$ and/or $a_2$) preferably correspond to ambiguities associated with data sources that are represented in $a_1$ or $a_2$ but not both. However, the shared and/or unique ambiguities can correspond to any suitable ambiguities. Similarly, each fixed integer phase ambiguity set can be associated with a transformation, $T_1$ and $T_2$ associated with the first and second integer phase ambiguity set, respectively. The transformations can be written as $$T_1 = \begin{bmatrix} T_{11} & T_{1c} \\ T_{c1} & T_{1cc} \end{bmatrix}$$

and $$T_2 = \begin{bmatrix} T_{22} & T_{2c} \\ T_{c2} & T_{2cc} \end{bmatrix}.$$

In this specific example, the transformed ambiguities $z_1$ and $z_2$ can be determined from $z_1 = T_1 a_1$ and $z_2 = T_2 a_2$. However, the transformed ambiguities can have any suitable form.

In variants that include an augmented integer ambiguity set, the augmented integer ambiguity set (e.g., augmented integer ambiguity space, augmented state vector, etc.) preferably functions to ensure that the transformed states have the same dimensions. In an illustrative example, the augmented integer ambiguity set can be written as $$\hat{a} = \begin{bmatrix} a'_1 \\ a'_2 \\ a_c \end{bmatrix}.$$

In this illustrative example, the augmented integer ambiguity set can be associated with a first and second augmented transformation that transforms the augmented integer ambiguity set to the first and second integer ambiguity sets. In this illustrative example, the augmented transformations can be written as:

$$\hat{z}_1 = \hat{T}_1 \hat{a} = \begin{bmatrix} T^1_{11} & 0 & T^1_{1c} \\ T^1_{c1} & 0 & T^1_{1cc} \end{bmatrix} \begin{bmatrix} a'_1 \\ a'_2 \\ a_c \end{bmatrix}$$

-continued $$\hat{z}_2 = \hat{T}_2 \hat{a} = \begin{bmatrix} 0 & T_{22}^2 & T_{2c}^2 \\ 0 & T_{c2}^2 & T_{2cc}^2 \end{bmatrix} \begin{bmatrix} a_1' \\ a_2' \\ a_c \end{bmatrix}.$$

In this specific example, the augmented transformations $\hat{T}_1$ and $\hat{T}_2$ are preferably re-ordered to align with the states of the augmented ambiguity vector. However, the augmented integer ambiguity set can include any suitable states and/or be arranged in any manner.

Determining an intersection transformation S450 functions to determine a transformation that transforms the state vectors to a shared intersection space. The intersection space preferably functions to enable the ambiguities to be compared in the same basis while retaining as many linearly independent rows or ambiguities as possible. The intersection space is preferably determined using the augmented transformations (augmented ambiguity transformations). However, the intersection space can be determined from the transformed ambiguities (e.g., $z_i$), the initial ambiguities (e.g., $a_i$), the initial transformations (e.g., $T_i$), the augmented integer phase ambiguities (e.g., a), and/or any suitable vector and/or transformation can be used.

Determining the intersection transformation (e.g., shared space) preferably determines the row$[\hat{T}_n]$=row$[\hat{T}_1]\cap$row$[\hat{T}_2]$, where row$[\hat{T}_\cap]$ is the shared space (e.g., the space of transformed ambiguities that is shared between $\hat{T}_1$ and $\hat{T}_2$), and $\cap$ represents the intersection. The row space of $T_i$, row$[\hat{T}_i]$, is preferably the set of vectors that result from the possible combinations of rows of matrix $T_i$. The row space of the intersection of $T_1$ and $T_2$, row$[\hat{T}_\cap]$, can then be determined from (e.g., is the same as) the intersection of the row space of $T_1$ with the row space of $T_2$, where the intersection of $T_1$ and $T_2$ can have the minimum number of rows that is possible while the row space condition is adhered to. However, the intersection transformation can be otherwise defined and/or determined.

The intersection space can be determined, for example, by concatenating the transformations into a concatenated matrix (e.g., S), and searching for the null space of S. In a specific example, S=$[\hat{T}_1^T|-\hat{T}_2^T]$, wherein | can represent a concatenation operation. In this example, the elements of S are preferably integers. However, the elements of S can be natural, rational, real, and/or complex valued.

In a specific example, the null space of S (e.g., null[S]) includes the set of vectors v=$[V_1\ V_2]$, where $V_1\hat{T}_1-V_2\hat{T}_2=0$. In this example, the null space of S can be partitioned into parts such as null[S]=$[V_1\ V_2]$. In this example, the parts of the null space can be used to define the intersection space row$[\hat{T}_\cap]$=$V_1\hat{T}_1$=$V_2\hat{T}_2$.

Each of the state vectors can be transformed to the intersection space, a subset of the state vectors (e.g., $a_1$ and $a_2$, $z_1$ and $z_2$, etc.) can be transformed to the intersection space, and/or any suitable states can be transformed to the intersection space. In a specific example, transforming the ambiguity vectors can include transforming the first set of fixed carrier ambiguities using the intersection transformation $\hat{T}_\cap$=$V_1\hat{T}_1$ so that the first set of carrier ambiguities are in the intersection space. Similarly, the second set of fixed carrier ambiguities using the intersection transformation $\hat{T}_\cap$=$V_2\hat{T}_2$. However, the ambiguity vectors can be transformed to any suitable space using any suitable transformation.

Comparing the state vectors in the intersection space S480 functions to determine whether the state vectors (or subsets thereof) match. The state vectors are preferably compared in the intersection space, but can additionally or alternatively be compared in the transformed space (e.g., comparing $z_1$ and $z_2$), in the untransformed space (e.g., comparing $a_1$ and $a_2$), in a different comparison space, and/or in any suitable space. S480 preferably compares the integer phase ambiguities associated with the same data source between the two state vectors. However, any suitable states can be compared. In an illustrative example, each row of the first state vector can be compared to the row of the second state vector with the same row index to identify matches between the respective integer phase ambiguities. In a second illustrative example, common ambiguities can be identified in the transformed space (e.g., by identifying the ambiguities determined from the same satellite observations, such as by using a unique satellite observation identifier) and compared.

The state vectors (and/or subsets thereof) preferably match (e.g., are cross-validated) when a validation criterion is satisfied. The validation criterion (e.g., collective convergence criterion) preferably includes the number of differing ambiguities (e.g., between one or more integer phase ambiguity in the intersection space, transformed space, untransformed space, etc.) being less than a threshold, but can additionally or alternatively include a residual threshold, one or more states (e.g., from each of the state vectors) matching (e.g., having an identical value such as in the intersection space, the transformation space, the untransformed space, etc.), a difference between two ambiguities (e.g., a difference threshold), a timeout, a quorum of matching transformed ambiguities, and/or any suitable criterion. However, the ambiguities can be compared in any suitable manner. The validation criterion can be based on (e.g., depend on) the number of ambiguities (e.g., a threshold number of ambiguities), depend on the data source(s) (e.g., number of satellites, number of satellite constellations, identity of the satellite constellation(s), etc.), and/or depend on any suitable properties.

When the validation criterion is satisfied, the first and/or second state vectors can be validated (e.g., cross-validated; considered validated or cross-validated), a subset of the state vectors (e.g., the state(s) that meet the validation criterion, common states, uncommon states, etc.) can be validated (e.g., cross-validated), and/or any suitable state(s) can be validated, where validated ambiguities can subsequently be used to correct the carrier measurements and/or otherwise be used to determine the receive and/or external system location. When the validation criterion is not satisfied, a new intersection space can be determined, a new set of state vectors can be compared, a flag can be issued that the state vectors cannot be cross-validated, transmitting an error message, calculating the receiver position (e.g., with non-validated ambiguities), starting a new time window, extending the time window, adding states (e.g., ambiguities) to the ambiguity vector(s), nullifying the ambiguity (and/or state) vectors, the external system can be operated at a lower accuracy and/or integrity level location determined, additional states can be determined (e.g., by performing S300), the method can be reinitiated, and/or any suitable response can be performed.

In a specific example, comparing the state vectors includes comparing the first and second fixed integer ambiguity set by checking whether $V_1\hat{z}_1$==$V_2\hat{z}_2$ is valid for each phase ambiguity. In this example, when the equality is valid (e.g., when $V_1\hat{z}_1$ matches $V_2\hat{z}_2$), a new transformation ($\hat{T}_\cap$=$V_1\hat{T}_1$) and corresponding ambiguities (e.g., fixed ambiguities, $z_\cap^1$=$V_1\hat{z}_1$) can be computed. However, when the equality is not valid (e.g., when $V_1\hat{z}_1$ does not match $V_2\hat{z}_2$), S480 can include determining transformations using a different pair of ambiguity vectors, reporting an error, starting a new time window (e.g., restarting the method, returning to S100), extending the current time window, starting a new filter (e.g., determining a new state vector such as in S300), modifying a filter (e.g., change inputs to the filter), and/or can perform any suitable steps. In a variation of this example, matching preferably corresponds to a matching criterion (e.g., score, metric, quality). The matching criterion can be a threshold (e.g., a maximum difference between each value in $V_1\hat{z}_1$ and $V_2\hat{z}_2$ such as each row, each column, each element, etc.), a threshold distance, a residual (e.g., a target residual, a maximum residual, etc.), and/or any suitable value. In a second variation of this example, matching can require the two state vectors (e.g., corresponding ambiguities, ambiguities in the intersection space, transformed ambiguities, etc.) to be the same. However, any suitable matching criterion can be used.

In specific variants, when a subset of the transformed ambiguity vectors match, that subset of ambiguities can be cross-validated (e.g., considered cross-validated) to generate a cross-validated fixed carrier ambiguity set. The cross-validated fixed carrier ambiguity set preferably includes at least 3 carrier phase ambiguities, but can contain fewer than 3 carrier phase ambiguities and/or any number of carrier phase ambiguities. In these variants, the subset of carrier ambiguities that do not match can be nullified (e.g., cleared from the state vectors), can be cross-validated (e.g., considered valid at the same time the remaining states are considered valid), undergo additional validation testing, and/or otherwise be processed. However, any suitable response can be taken in response to a subset of the ambiguity vectors not matching. However, the fixed ambiguity vector (e.g., validated ambiguity vector) can be determined in any suitable manner.

Determining the receiver position S500 preferably functions to calculate the position of the receiver (and/or external system) based on the fixed state vector (e.g., the fixed ambiguity vector). S400 is preferably performed by the computing system; however, S400 can additionally and/or alternatively be performed by the receiver, a reference station, and/or by any suitable component. The position of the receiver position is preferably determined from the cross-validated fixed carrier ambiguities; however, the receiver position can additionally or alternatively be determined using the first carrier phase ambiguity set (or a subset thereof), the second carrier phase ambiguity set (or a subset thereof), combinations of the above carrier phase ambiguities, and/or using any suitable states and/or data. In a specific example, the union of the state vectors (e.g., the validated states from each of the state vectors, the augmented carrier phase ambiguities, etc.) can be used to determine the receiver position. However, any power set of the state vectors (e.g., validated in S400, fixed or otherwise determined in S300) and/or any suitable states (and/or state vectors) can be used.

In specific variants including reference stations, the baseline vector b, corresponding to the position of the receiver relative to a reference station, can be determined. The baseline vector can be determined based on the fixed integer ambiguity. However, the baseline vector can be determined in any suitable manner. In these variants, the position of the receiver (e.g., relative to the reference station(s), absolute position) can be determined by applying b to the reference station location. However, S500 can determine (e.g., calculate) the receiver position in any suitable manner.

S500 can include determining an external system (e.g., vehicle) position and/or location based on the receiver position. The external system position can be determined based on a transformation from a receiver coordinate to an external system coordinate, based on a known relative position of the receiver to the external system, and/or otherwise be determined. The external system position can be a relative position (e.g., relative to the receiver, relative to a reference location, etc.) and/or an absolute position (e.g., coordinates).

S500 can include generating instructions for operation of the external system based on the external system location. For example, operation instructions for a vehicle can include making lane adjustments to remain within a lane of traffic, turning instructions, and/or other instructions for traversing a path, obeying laws, and/or other purposes.

Figure 4A:
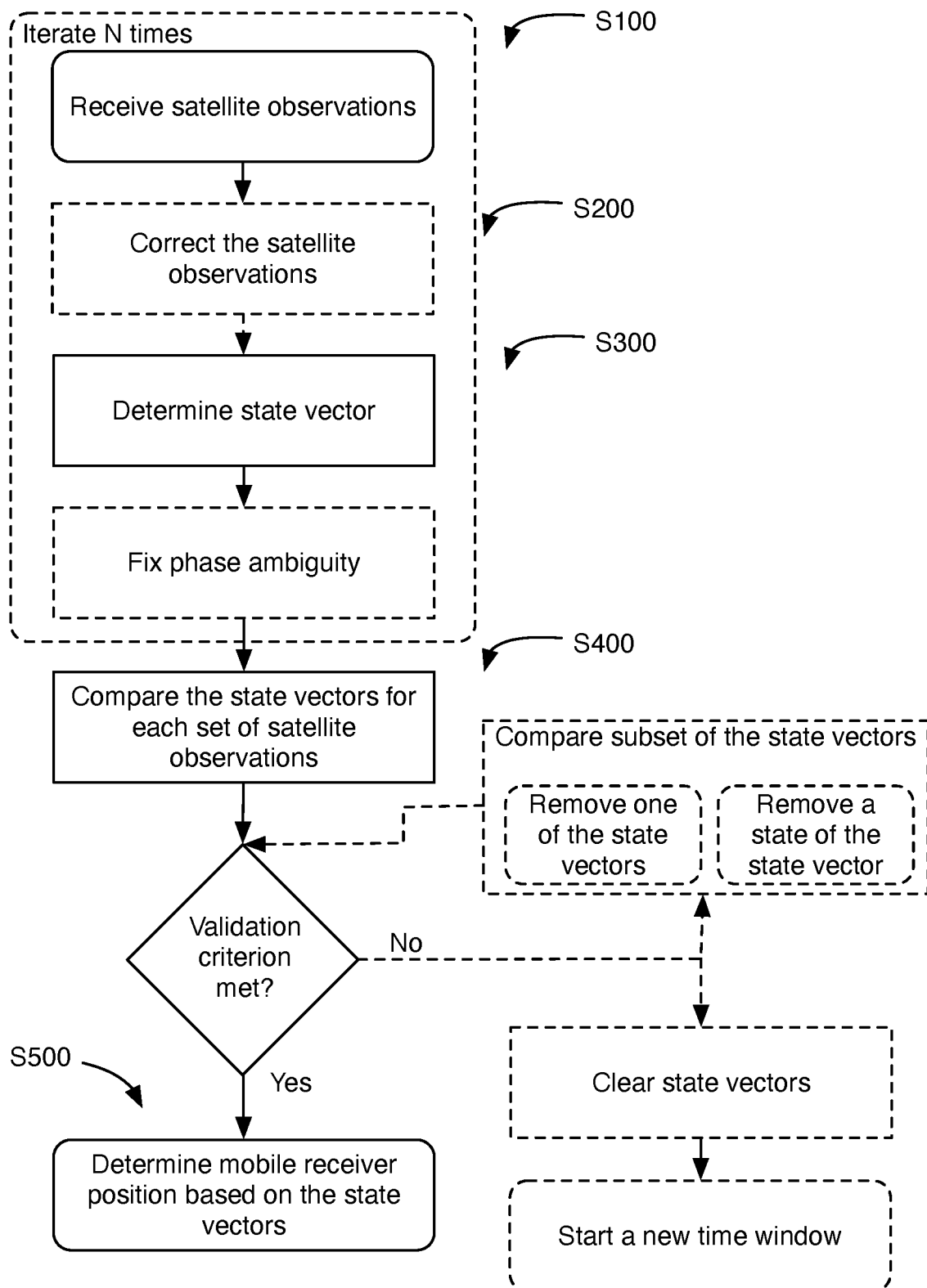
FIG. 4A is a block diagram representation of an example of the method.

In a specific example, as shown in FIG. 4A, the method can include receiving one or more sets of satellite observations, correcting each set of the satellite observations, determining a state vector associated with each set of satellite observations, fixing the carrier phase ambiguities for each state vector, and comparing the phase ambiguities associated with each of the state vectors. When a validation criterion is met, the phase ambiguities can be cross-validated. The cross-validated carrier phase ambiguities (e.g., cross-validated fixed carrier phase ambiguities) can be used to determine the receiver position. However, the method can include any suitable steps.

Figure 4B:
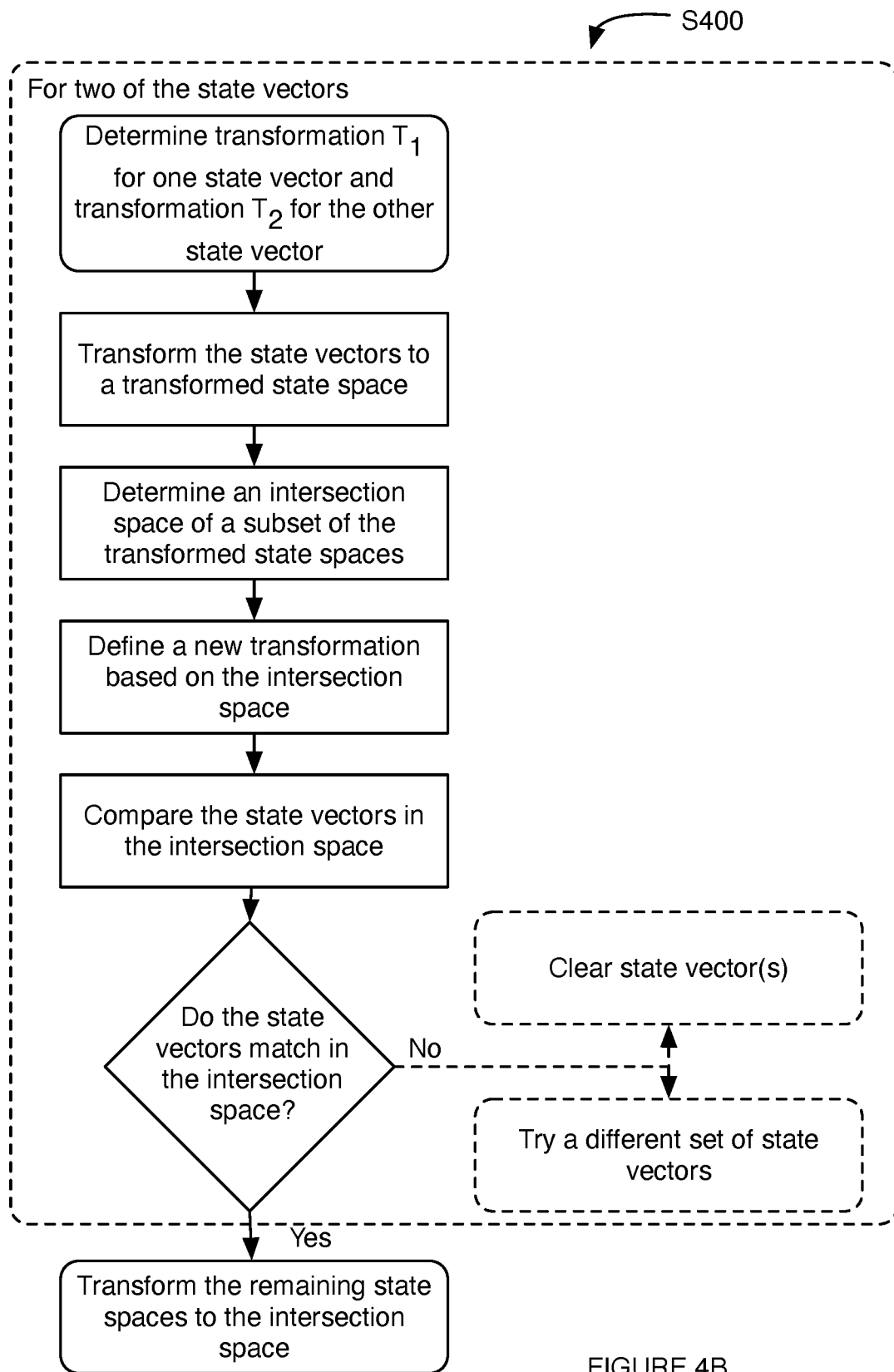
FIG. 4B is a block diagram representation of an example of validating the state vectors.

In a specific example, as shown in FIG. 4B, comparing the state vectors can use two of the state vectors (e.g., from the set of N state vectors) to determine an intersection transformation to bring the set of state vectors to an intersection space. In this example, a transformation $T_1$ can be associated with the first state vector and a transformation $T_2$ can be associated with the second state vector can be determined. $T_1$ and $T_2$ are preferably different; however, $T_1$ and $T_2$ can be the same. The transformations can be used to convert the state vectors (e.g., ambiguity vectors of the state vectors) to a transformed spaced (e.g., transformed state vectors). The transformations (and/or transformed state vectors) can be used to determine an intersection space and associated intersection transformation that transforms the state vectors (or transformed state vectors) to the intersection space. The intersection space can correspond to a portion of (up to and including) all of the transformed space. The intersection space is preferably nontrivial (e.g., contains elements other than 0 and/or null values). After determining the intersection space, a new transformation (e.g., $V_1$ and $V_2$) can be determined for each transformed state vector. Both of the transformed state vectors can be transformed into the intersection space, for example to generate intersection space state vectors. The intersection space state vectors can be compared for example based on a validation criterion. When the intersection space state vectors match, the intersection space transformation can be applied to the other state vectors. In this specific example, when the intersection space state vectors do not match (and/or $T_\cap$ is a trivial transformation), the state vectors can be nullified and/or a different pair of state vectors can be compared. However, comparing the state vectors can be performed in any suitable manner.

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for determining a mobile receiver position comprising:
    receiving a first and a second set of satellite observations;
    determining a first fixed ambiguity set associated with the first set of satellite observations and a second fixed ambiguity set associated with the second set of satellite observations, wherein the first fixed ambiguity set is associated with a first transformation and the second fixed ambiguity set is associated with a second transformation;
    determining a first and a second intersection transformation from the first and second transformations, wherein the first and second intersection transformations transform the first and second fixed ambiguity sets to a shared intersection space;
    determining cross-validated ambiguities from the first and second fixed ambiguity sets, wherein a cross-validated ambiguity is identified when a number of differing ambiguities from the first and second fixed ambiguity sets in the shared intersection space is less than a threshold; and
    determining the mobile receiver position based on at least one of the first or second fixed ambiguity sets.

2. The method of claim 1, further comprising:
    generating an augmented ambiguity set from the first and second fixed ambiguity sets;
    determining augmented first and second transformations based on the augmented ambiguity set and the first and second transformation; and
    wherein the first and second intersection transformation are determined based on the augmented first and second transformations.

3. The method of claim 2, wherein the first and second fixed ambiguity sets comprise common fixed ambiguities, wherein the augmented ambiguity set includes the common fixed ambiguities.

4. The method of claim 3, wherein the augmented ambiguity set includes the uncommon ambiguities from the first and second fixed ambiguity sets.

5. The method of claim 1, further comprising determining a union of ambiguities between the first and second fixed ambiguity sets, wherein the union of ambiguities is used to determine the mobile receiver position.

6. The method of claim 1, further comprising determining a position of an external system based on the mobile receiver position.

7. The method of claim 6, further comprising operating the external system based on to the external system position.

8. The method of claim 1, wherein the first and second transformations are distinct.

9. The method of claim 1, wherein determining each of the first and second fixed ambiguity set comprises:
    determining a set of integer phase ambiguity hypotheses associated with the respective set of satellite observations; and
    internally-validating the set of integer phase ambiguities.

10. The method of claim 9, wherein internally-validating the set of integer phase ambiguities comprises:
    performing hypothesis testing on the set of integer phase ambiguity hypotheses, wherein the hypothesis testing comprises determining a ratio between likelihoods of two integer phase ambiguity hypotheses; and
    ceasing hypothesis testing when the ratio exceeds a threshold value.

11. The method of claim 9, wherein determining the set of integer phase ambiguity hypotheses for each of the first and second ambiguity set comprises:
    determining a set of floating integer phase ambiguities using a Kalman filter; and
    determining the set of integer phase ambiguity hypotheses using at least one of a LAMBDA or MLAMBDA search algorithm.

12. The method of claim 1, further comprising correcting the first and second set of satellite observations using a set of corrections received from a correction service, wherein the corrected first and second set of satellite observations are used to determine the first and second fixed ambiguity sets.

13. A system comprising:
    a receiver comprising a processing module configured to:
        receive a first and a second set of satellite observations;
        determine a first fixed ambiguity set associated with the first set of satellite observations and a second fixed ambiguity set associated with the second set of satellite observations, wherein the first fixed ambiguity set is associated with a first transformation and the second fixed ambiguity set is associated with a second transformation;
        generate an augmented ambiguity set from the first and second fixed ambiguity sets;
        determine augmented first and second transformations based on the augmented ambiguity set and the first and second transformation;
        determine a first and a second intersection transformation that transforms the first and second fixed ambiguity sets, respectively, to a shared intersection space;
        determine cross-validated ambiguities from the first and second fixed ambiguity sets, wherein a cross-validated ambiguity is identified when a number of differing ambiguities from the first and second fixed ambiguity sets in the shared intersection space is less than a threshold; and
        determine the receiver position based on at least one of the first or second fixed ambiguity sets.

14. The system of claim 13, wherein the processing module is further configured to:
    generate an augmented ambiguity set from the first and second fixed ambiguity sets;

determine augmented first and second transformations based on the augmented ambiguity set and the first and second transformation; and wherein the first and second intersection transformation are determined based on the augmented first and second transformations.

15. The system of claim 14, wherein the processing module is further configured to determine a union of ambiguities between the first and second fixed ambiguity sets, wherein the union of ambiguities is used to determine the receiver position.

16. The system of claim 13, further comprising a second receiver, wherein the receiver is configured to receive satellite observations of the first and second set of satellite observations associated with a first satellite constellation and the second receiver is configured to receive satellite observations of the first and second set of satellite observations associated with a second satellite constellation.

17. The system of claim 13, further comprising a vehicle wherein the receiver is mounted to the vehicle, wherein the processing module is further configured to determine a location of the vehicle based on the receiver position.

18. The system of claim 17, wherein the processing module is further configured to generate instructions for operation of the vehicle based on the vehicle location.

19. The system of claim 13, wherein determining each of the first and second fixed ambiguity set comprises:
- determining a set of integer phase ambiguity hypotheses associated with the respective set of satellite observations;
- performing hypothesis testing on the set of integer phase ambiguity hypotheses, wherein the hypothesis testing comprises determining a ratio between likelihoods of two integer phase ambiguity hypotheses; and
- ceasing hypothesis testing when the ratio exceeds a threshold value.

20. The system of claim 19, wherein determining a set of integer phase ambiguity hypotheses for each of the first and second ambiguity set comprises:
- determining a set of floating integer phase ambiguities using a Kalman filter; and
- determining the set of integer phase ambiguity hypotheses using at least one of a LAMBDA or MLAMBDA search algorithm.

* * * * *